(12) United States Patent
Seo et al.

(10) Patent No.: US 9,004,249 B2
(45) Date of Patent: Apr. 14, 2015

(54) HYDRAULIC CLUTCH

(75) Inventors: Kangsoo Seo, Suwon-si (KR); Jaeyoung Jeon, Paju-si (KR); Wonseok Oh, Incheon (KR); Seongwook Ji, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 242 days.

(21) Appl. No.: 13/316,302

(22) Filed: Dec. 9, 2011

(65) Prior Publication Data

US 2013/0075216 A1 Mar. 28, 2013

(30) Foreign Application Priority Data

Sep. 22, 2011 (KR) .......................... 10-2011-0095901

(51) Int. Cl.
| | |
|---|---|
| F16D 25/0638 | (2006.01) |
| F16D 25/08 | (2006.01) |
| F16D 21/02 | (2006.01) |
| F16D 25/10 | (2006.01) |
| F16D 25/12 | (2006.01) |
| F16D 48/02 | (2006.01) |

(52) U.S. Cl.
CPC ............ *F16D 25/0638* (2013.01); *F16D 25/10* (2013.01); *F16D 25/12* (2013.01); *F16D 2048/0212* (2013.01)

(58) Field of Classification Search
USPC ............ 192/48.611, 48.601, 48.602, 48.603, 192/48.604, 48.605, 48.606, 48.607, 192/48.608, 48.609, 85.45, 85.25, 106 F; 475/146
See application file for complete search history.

(56) References Cited

U.S. PATENT DOCUMENTS

| | | | |
|---|---|---|---|
| 7,293,637 B2 | 11/2007 | Janson et al. | |
| 7,478,718 B2 | 1/2009 | De Maziere | |
| 7,631,739 B2 | 12/2009 | Enstrom | |
| 2005/0279605 A1* | 12/2005 | Sowul et al. ............... | 192/48.91 |
| 2007/0175726 A1* | 8/2007 | Combes et al. ............ | 192/87.11 |
| 2007/0256907 A1 | 11/2007 | Gremplini et al. | |
| 2008/0041688 A1* | 2/2008 | Bauer et al. ................ | 192/87.11 |
| 2009/0211865 A1* | 8/2009 | Braford et al. ............. | 192/70.11 |

FOREIGN PATENT DOCUMENTS

| | | |
|---|---|---|
| JP | 2005-188640 | 7/2005 |
| JP | 2005-249126 | 9/2005 |
| JP | 2008-8432 A | 1/2008 |
| JP | 2009-243626 A | 10/2009 |
| JP | 2010-144792 A | 7/2010 |
| JP | 4720302 B2 | 7/2011 |

* cited by examiner

*Primary Examiner* — Rodney H Bonck
*Assistant Examiner* — Stacey Fluhart
(74) *Attorney, Agent, or Firm* — Morgan, Lewis & Bockius LLP

(57) ABSTRACT

A hydraulic pressure clutch includes a first connecting hub on an input shaft, an inner sleeve, a boss, an outer sleeve, a clutch drum, a second connecting hub, a first piston forming a first piston chamber together with the second connecting hub, first clutch plates disposed on an outer protrusion and selectively pushed by the first piston along an axial direction, first friction disks disposed alternately with the first clutch plates, a first balance wall forming a first balance chamber, a second piston forming a second piston chamber, second clutch plates selectively pushed by the second piston along an axial direction, second friction disks disposed alternately with the second clutch plates, and a second balance wall forming a second balance chamber, wherein the first piston penetrates through the outer protrusion for pushing the first clutch plates.

4 Claims, 1 Drawing Sheet

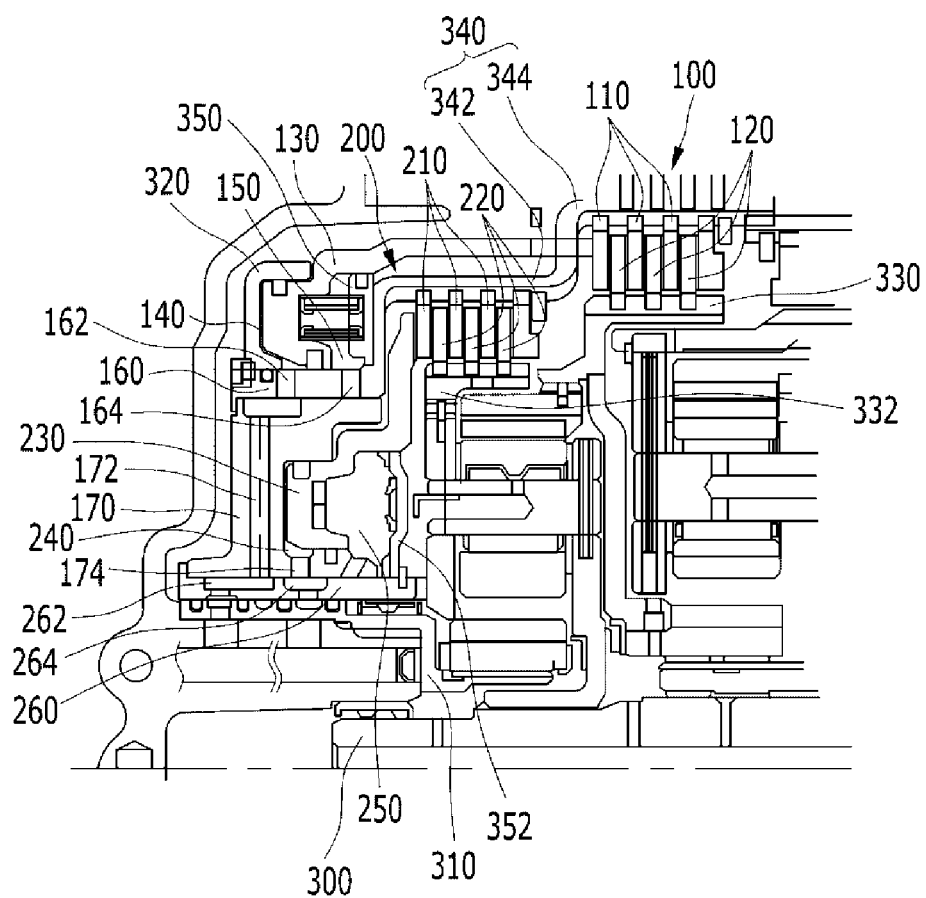

HYDRAULIC CLUTCH

CROSS-REFERENCE TO RELATED APPLICATION

This application claims priority to and the benefit of Korean Patent Application No. 10-2011-0095901 filed Sep. 22, 2011, the entire contents of which application is incorporated herein for all purposes by this reference.

BACKGROUND OF INVENTION

1. Field of Invention

The present invention relates to a hydraulic pressure clutch. More particularly, the present invention relates to a hydraulic pressure clutch provided with more than two clutches.

2. Description of Related Art

An automatic transmission is an apparatus for shifting gears to a appropriate shift gear according to vehicle's running state. Generally an automatic transmission includes at least one planetary gear set including a sun gear, a ring gear, and a planet carrier as operating members, and friction elements such as a clutch and a brake for controlling operations of the operating members.

And also the automatic transmission further includes a hydraulic control system for controlling the friction members hydraulically. The clutches and brakes are controlled to be engaged or disengaged by operation of the hydraulic control system according to each shift gear so that each shift gear is realized.

The clutch of the friction members transmits power of an engine to the operating member of the planetary gear set or delivers power between the operating members. The clutch may be used for delivering power for various machines as well as for the automatic transmission.

The clutch includes a piston, a plurality of clutch plates and a plurality of friction disks alternately disposed with the plurality of clutch plates. When hydraulic pressure is supplied to the piston, the clutch plate moves to contact the friction disk and ultimately, the gear shift is shifted to a target gear shift. When the hydraulic pressure is released from the piston, the piston returns to an original position by a return spring and so on, and the clutch plate moves to be separated from the friction disk by a reaction plate and so on, and ultimately, the operation members are released.

Recently an automatic transmission for a front-wheel-drive car has been developed to be multiple gear shifts, and thus total length increase of the automatic transmission may disturb to mount the automatic transmission into an engine room. And thus, if axial direction length for a clutch is reduced, length of an automatic transmission may be reduced. And also, an automatic transmission which may realize multiple gear shifts may be mounted into a front-wheel-drive car.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a hydraulic pressure clutch having advantages of reducing a number of constitutional elements, total length of an automatic transmission and weight of a vehicle.

A hydraulic pressure clutch according to various aspects of the present invention may include a first connecting hub disposed on an input shaft, an inner sleeve connected to an outer portion of the first connecting hub, a boss connected to an outer portion of the inner sleeve, an outer sleeve connected to an outer portion of the boss, a clutch drum comprising an inner protrusion connected to an outer portion of the outer sleeve and forming a clutch mounting space and an outer protrusion forming the other clutch mounting space, a second connecting hub connected to an outer portion of the outer sleeve, a first piston forming first piston chamber together with the second connecting hub therebetween and being operated by hydraulic pressure input to the first piston chamber, a plurality of the first clutch plate disposed on the outer protrusion and selectively pushed by the first piston along an axial direction, a plurality of the first friction disk disposed on the first clutch hub alternately with the first clutch plates, a first balance wall connected to the inner protrusion and forming a first balance chamber together with the first piston therebetween, a second piston forming the second piston chamber together with the boss therebetween, and being operated by hydraulic pressure input to the second piston chamber, a plurality of the second clutch plate disposed on the inner protrusion and selectively pushed by the second piston along an axial direction, a plurality of the second friction disk disposed on the second clutch hub alternately with the second clutch plates and a second balance wall forming a second balance chamber together with the second piston therebetween, wherein the first piston penetrates through the outer protrusion for pushing the first clutch plates.

The first piston chamber may be formed outside of the clutch drum independent from the second piston chamber.

The first piston chamber and the second piston chamber may be connected to separate oil passages respectively.

The first balance chamber of which hydraulic pressure is supplied for the first piston to return to and the second balance chamber of which hydraulic pressure is supplied for the second piston to return to are independently formed.

According to various aspects of the present invention, two clutches are disposed on one drum, and thus total numbers of the hydraulic pressure clutch may be reduced and scheme of the hydraulic pressure clutch may be simplified. And thus, length of an automatic transmission and weight of a vehicle may be reduced. Also production cost of the hydraulic pressure clutch may be reduced and fuel consumption may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The FIGURE is a cross sectional view of an exemplary hydraulic pressure clutch according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

The FIGURE is a cross sectional view of a hydraulic pressure clutch according to various embodiments of the present invention.

As shown in the FIGURE, a hydraulic pressure clutch according to various embodiments of the present invention includes a first and a second clutch portion 100 and 200, an inner sleeve 260, an outer sleeve 160, a boss 170 and a clutch drum 340.

The first clutch portion 100 includes a first clutch plate 110, a first friction disk 120, a first piston 130, a first piston chamber 140 and a first balance chamber 150.

The first clutch plate 110 and the first friction disk 120 are plural and disposed along length direction of a transmission input shaft 300. And the first clutch plate 110 and the first friction disk 120 are alternately disposed. The first clutch plates 110 are selectively pushed to contact the first friction disks 120 so that shifting to a target gear shift may be realized.

The first piston 130 may selectively push the first clutch plate 110. When hydraulic pressure is supplied to the first piston chamber 140, the first piston 130 pushes the first clutch plate 110 along length direction of the transmission input shaft 300. When the hydraulic pressure within the first piston chamber 140 is released and hydraulic pressure is supplied to the first balance chamber 150, the first piston 130 returns to original position and simultaneously the first clutch plate 110 also returns to original position. The returning of the first clutch plate 110 may be realized with various methods by a person skilled in the art.

The second clutch portion 200 includes a second clutch plate 210, a second friction disk 220, a second piston 230, a second piston chamber 240 and a second balance chamber 250.

Operations of the each constitutional element of the second clutch portion 200 are correspondent to those of the first clutch portion 100 and thus detailed description will be omitted.

The inner sleeve 260, the outer sleeve 160 and the boss 170 are mutually connected to support the constituent elements of the first and second clutch portion 100 and 200. In the inside of the inner sleeve 260, the outer sleeve 160 and the boss 170, a plurality of oil passage 162, 164, 172, 174, 262 and 264 are formed to supply hydraulic pressure to the first and second piston chamber 140 and 240 and the first and second balance chamber 150 and 250. The boss 170 may be made of relatively light material compared to the inner and outer sleeves 160 and 260 so that weight of a vehicle may be reduced.

The clutch drum 340 has a bent shape for forming at least two or more of clutch mounting spaces.

The hydraulic pressure clutch according to various embodiments of the present invention further includes a first and a second connecting hub 310 and 320, a first and a second clutch hub 330 and 332 and a first and a second balance wall 350 and 352.

The first connecting hub 310 is disposed on the transmission input shaft 300 and the inner sleeve 260 is connected to an outer portion thereof.

The second connecting hub 320 is connected to an outer portion of the outer sleeve 160 and the first piston chamber 140 is formed between the second connecting hub 320 and the first piston 130.

The first friction disk 120 is mounted to outer portion of the first clutch hub 330.

The second friction disk 220 is mounted to an outer portion of the second clutch hub 332.

The first balance wall 350 is disposed on outer portion of the outer sleeve 160 and the first balance chamber 150 is formed between the first balance wall 350 and the first piston 130.

The second balance wall 352 is disposed on an outer portion of the inner sleeve 260 and the second balance chamber 250 is formed between the second balance wall 352 and the second piston 230.

Hereinafter, referring to the FIGURE, detailed constitutional elements will be described.

The first connecting hub 310 is disposed on the input shaft 300.

The inner sleeve 260 is connected to an outer portion of the first connecting hub 310 and the plurality of oil passages 262 and 264 are formed on the inner sleeve 260.

The boss 170 is connected to an outer portion of the inner sleeve 260 and the plurality of oil passages 172 and 174 are formed to the boss 170. The plurality of oil passages 172 and 174 formed to the boss 170 and the plurality of oil passages 262 and 264 formed to the inner sleeve 260 may communicate with each other as a pair respectively.

The outer sleeve 160 is connected to an outer portion of the boss 170 and a plurality of oil passages 162 and 164 are formed to the outer sleeve 160. The plurality of oil passages 162 and 164 formed to the outer sleeve 160 and the plurality of oil passages 172 and 174 formed to the boss 170 may communicate with each other as a pair respectively. That is, the oil passages 162, 164, 172, 174, 262 and 264 formed to the inner sleeve 260, the boss 170 and the outer sleeve 160 may communicate with each other as a pair respectively for supplying hydraulic pressure to the first and second piston chamber 140 and 240 and the first and second balance chamber 150 and 250 respectively.

The clutch drum 340 includes an inner protrusion 342 and an outer protrusion 344.

The inner protrusion 342 is connected to an outer portion of the outer sleeve 160 and has a bent shape for forming a clutch mounting space accommodating the second clutch portion 200 therewithin.

The outer protrusion 344 is extended from the inner protrusion 342 and integrally formed, and has a bent shape for forming a clutch mounting space accommodating the first clutch portion 100 therewithin. One will appreciate that the outer and inner protrusions may be monolithically formed.

The second connecting hub 320 is connected to an outer portion of the outer sleeve 160. The second connecting hub 320 is disposed apart from the inner protrusion 342.

The first piston 130 is disposed between the second connecting hub 320 and the inner protrusion 342 of the clutch drum 340 on the upper portion of the outer sleeve 160. The first piston chamber 140 is formed between the first piston 130 and the second connecting hub 320. The first piston 130 is operated by hydraulic pressure supplied to the first piston chamber 140.

The first clutch plate 110 is mounted to the outer protrusion 344 and the first friction disk 120 is mounted to the first clutch hub 330. The first clutch plate 110 and the first friction disk 120 are disposed alternately along the length direction of the input shaft 300 as a plural. The first clutch plate 110 is selectively pushed toward length direction of the input shaft 300 by the first piston 130. The first piston 130 penetrates through the outer protrusion 344 of the clutch drum 340 for pushing the first clutch plates 110.

The first balance wall 350 disposed on an outer portion of the outer sleeve 160 and connected to the inner protrusion 342. The first balance chamber 150 is formed between the first balance wall 350 and the first piston 130. The first piston 130 which is operated by the hydraulic pressure supplied to the first piston chamber 140 may be returned to original position by hydraulic pressure supplied to the first balance chamber 150.

The second piston 230 is disposed on a side of the boss 170. The second piston chamber 240 is formed between the boss 170 and the second piston. The second piston 230 is selectively operated by hydraulic pressure supplied to the second piston chamber 240.

The second clutch plate 210 is mounted to the inner protrusion 342 and the second friction disk 220 is mounted to the second clutch hub 332. As described above, the second clutch plate 210 and the second friction disk 220 are plural and disposed along the length direction of the input shaft 300 alternately. The second clutch plate 210 is selectively pushed by the second piston 230 along the length direction of the input shaft 300. The second piston 230 is disposed on inside of the boss 170 and the clutch drum 340.

The second balance wall 352 is disposed on an outer portion of the inner sleeve 260 and forms the second piston chamber 240 together with the second piston 230. The second piston 230 which is operated by the hydraulic pressure supplied to the second piston chamber 240 may be returned to original position by hydraulic pressure supplied to the second balance chamber 250.

As described above, the first piston chamber 140, the first balance chamber 150, the second piston chamber 240 and the second balance chamber 250 are independently formed respectively. And as shown in the FIGURE, the first piston chamber 140 and the second piston chamber 240 are respectively communicated with oil passages and thus independent oil supplying is possible.

Also, two clutch portion 100 and 200 are disposed on one clutch drum 340 and the first piston 130, the first piston chamber 140 and the first balance chamber 150 are disposed on outer side of the clutch drum 340 and thus a number of constitutional elements of the hydraulic pressure clutch may be reduced and scheme of the hydraulic pressure clutch may be simplified. In various embodiments of the present invention, while two clutch portions 100 and 200 are provided to the hydraulic pressure clutch, however it is not limited thereto, on the contrary more than two clutch portions may be provided to the hydraulic pressure clutch.

And thus, length of an automatic transmission and weight of a vehicle may be reduced. Also production cost of the hydraulic pressure clutch may be reduced and fuel consumption may be improved.

For convenience in explanation and accurate definition in the appended claims, the terms upper, and etc. are used to describe features of the exemplary embodiments with reference to the positions of such features as displayed in the FIGURES.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure clutch comprising:
    a first connecting hub disposed on an input shaft;
    an inner sleeve connected to an outer portion of the first connecting hub;
    a boss connected to an outer portion of the inner sleeve;
    an outer sleeve connected to an outer portion of the boss in a radial direction of the input shaft;
    a clutch drum comprising:
        an inner protrusion directly connected to an outer portion of the outer sleeve and forming a first clutch mounting space; and
        an outer protrusion forming a second clutch mounting space, wherein the outer protrusion is disposed away from the inner protrusion in a radial direction of the input shaft;
    a second connecting hub connected to an outer portion of the outer sleeve;
    a first piston forming a first piston chamber together with the second connecting hub and the outer sleeve therebetween and being operated by hydraulic pressure input to the first piston chamber;
    a plurality of first clutch plates disposed on the outer protrusion and selectively pushed by the first piston along an axial direction;
    a plurality of first friction disks disposed on a first clutch hub alternately with the first clutch plates;
    a first balance wall connected to the inner protrusion and forming a first balance chamber together with the first piston and the outer sleeve therebetween;
    a second piston forming the second piston chamber together with the boss therebetween, and being operated by hydraulic pressure input to the second piston chamber, wherein the second piston chamber, the outer sleeve and the first piston chamber are positioned sequentially from the input shaft in the radial direction;
    a plurality of second clutch plates disposed on the inner protrusion and selectively pushed by the second piston along the axial direction;
    a plurality of second friction disks disposed on a second clutch hub alternately with the second clutch plates; and
    a second balance wall forming a second balance chamber together with the second piston therebetween, wherein the second balance chamber, the outer sleeve and the first balance chamber are positioned sequentially from the input shaft in the radial direction;
    wherein the first piston penetrates through the outer protrusion for pushing the first clutch plates.

2. The hydraulic pressure clutch of claim 1, wherein the first piston chamber is formed outside of the clutch drum independent from the second piston chamber.

3. The hydraulic pressure clutch of claim 2, wherein the first piston chamber and the second piston chamber are connected to separate oil passages respectively.

4. The hydraulic pressure clutch of claim 1, wherein the first balance chamber of which hydraulic pressure is supplied for the first piston to return to and the second balance chamber of which hydraulic pressure is supplied for the second piston to return to are independently formed.

* * * * *